United States Patent
Flegel

(10) Patent No.: US 6,365,990 B2
(45) Date of Patent: *Apr. 2, 2002

(54) COVER PLATE TERMINAL ASSEMBLY FOR A TRANSFER SWITCH

(75) Inventor: David D. Flegel, Racine, WI (US)

(73) Assignee: Reliance Controls Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/336,900

(22) Filed: Jun. 21, 1999

(51) Int. Cl.$^7$ .................................................. H02J 7/00
(52) U.S. Cl. ............................. 307/64; 307/30; 361/641
(58) Field of Search ...................... 307/30, 64; 361/643, 361/644, 652, 641

(56) References Cited

U.S. PATENT DOCUMENTS

| | | |
|---|---|---|
| 3,277,251 A | 10/1966 | Daly |
| 3,284,591 A | 11/1966 | Daly |
| 3,361,938 A | 1/1968 | Watson |
| 3,391,374 A | 7/1968 | Schleicher |
| 3,523,166 A | 8/1970 | Daly |
| 3,559,148 A | 1/1971 | Hafer |
| 3,636,237 A | 1/1972 | Hafer |
| 3,654,484 A | 4/1972 | Jorgenson et al. |
| 3,716,683 A | 2/1973 | Hafer |
| 3,723,942 A | 3/1973 | Dennison |
| 3,731,256 A | 5/1973 | Hafer |
| 3,739,321 A | 6/1973 | Murphy et al. |
| 3,742,431 A | 6/1973 | Kobyner |
| 3,781,765 A | 12/1973 | Schleicher |
| 3,895,179 A | 7/1975 | Wyatt |
| 3,922,053 A | 11/1975 | Hafer |
| 4,067,529 A | 1/1978 | Milcoy |
| 4,088,829 A | 5/1978 | Milcoy |
| 5,070,252 A | 12/1991 | Castenschiold et al. |
| 5,268,850 A | 12/1993 | Skoglund |
| 5,761,027 A | 6/1998 | Flegel |
| 5,870,276 A | * 2/1999 | Leach et al. ................. 361/627 |
| 5,895,981 A | 4/1999 | Flegel |
| 6,163,449 A | * 12/2000 | Flegel ......................... 361/601 |

OTHER PUBLICATIONS

"Gentran" Brochure No. GT1094C, Reliance Time Controls, Inc., 1820 Layard Avenue, Racine, WI 53404.

* cited by examiner

Primary Examiner—Josie Ballato
Assistant Examiner—Sharon Polk
(74) Attorney, Agent, or Firm—Andrus, Sceales, Starke & Sawall, LLP

(57) ABSTRACT

A power transfer device having various electrical components adapted for interconnection with the electrical system of a building includes a cabinet having a face plate provided with a socket opening which normally accommodates a power input receptacle adapted to receive a plug connector electrically connected to a generator. The power transfer device includes an internal compartment defined by the cabinet, and a set of connections corresponding to the electrical components located within the internal compartment. A cover plate terminal assembly is removably connected to the face plate for covering the socket opening to prevent access to the internal compartment and for providing a direct, permanently wired power input arrangement rather than a plug-type power input via a power input receptacle. The cover plate terminal assembly is also electrically interconnected with the electrical component connections in the internal compartment.

15 Claims, 4 Drawing Sheets

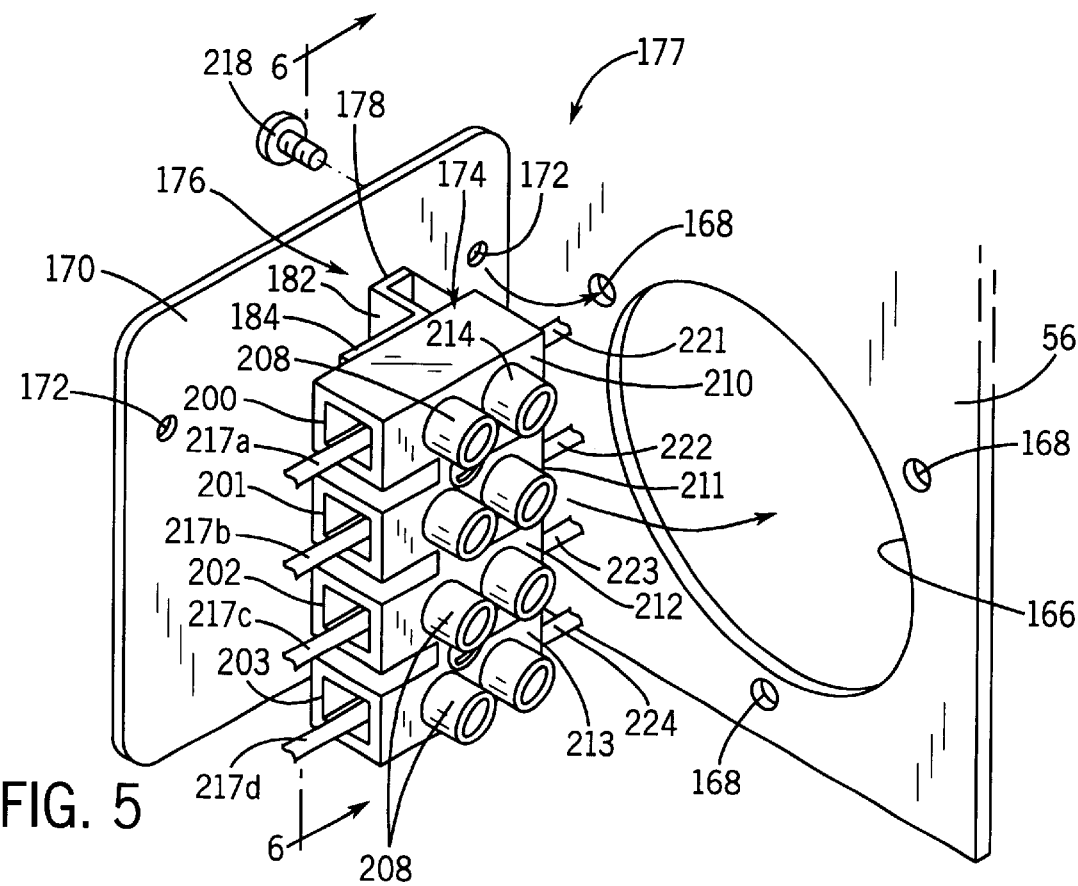
FIG. 5
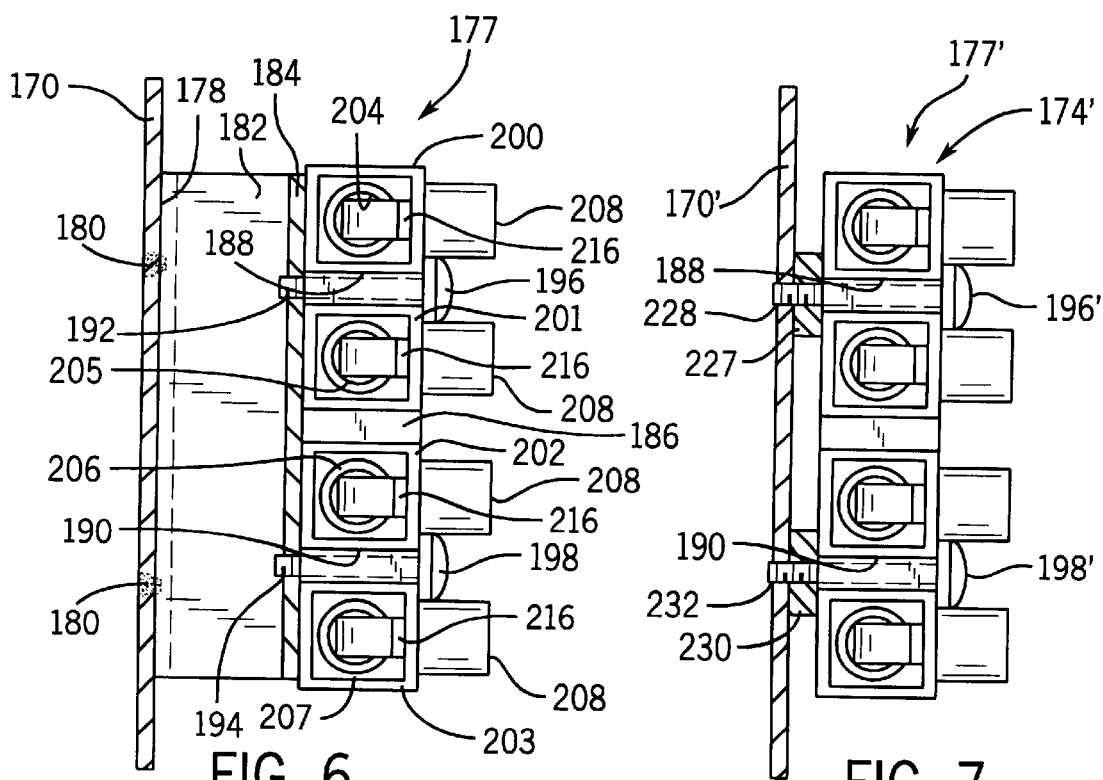
FIG. 6
FIG. 7

COVER PLATE TERMINAL ASSEMBLY FOR A TRANSFER SWITCH

BACKGROUND AND SUMMARY OF THE INVENTION

This invention relates to a power transfer arrangement for providing power to the electrical system of a building, such as power supplied from a standby generator.

Portable generators may be used in certain situations to feed electrical power to residential and commercial load circuits during a utility power outage. These systems in their most basic form include a generator or other auxiliary source of power positioned exteriorly of a building. The generator is connected to a transfer switching mechanism which continues the electrical path through circuit breakers associated with the transfer switching mechanism to supply power to certain selected circuits of the load center as determined by the transfer switching mechanism circuit breakers. The circuits of the transfer switching mechanism are wired to selected circuits of the load center through wiring housed within a conduit extending between the load center and the transfer switching mechanism.

The present invention relates to a power transfer switching mechanism for interposition between a remote power inlet box and the electrical load center of a building. Such a switching mechanism typically includes a cabinet having a panel provided with an opening for accommodating power input structure, such as a socket-type power input receptacle. The input receptacle is adapted to selectively receive a plug connector electrically interconnected with a source of auxiliary power such as a generator, and is interconnected with a bus bar within the cabinet. Circuit breakers are mounted to the bus bar for receiving power from the generator through the input receptacle to provide auxiliary power to selected circuits of the load center. Transfer switching mechanisms of this type are commercially available from Reliance Controls Corporation of Racine, Wis. under the designation GEN/TRAN.

While the above-described transfer switching mechanism provides an extremely convenient and simple arrangement for establishing a selective connection with the power inlet box, it is sometimes desirable to provide a power transfer switching mechanism without a pronged power input receptacle in its cabinet panel, in which the remote power inlet box is wired directly to the transfer switching mechanism. One such arrangement is shown and described in copending application Ser. No. 09/021,670, filed Feb. 10, 1998, the disclosure of which is hereby incorporated by reference, which contemplates a set of terminals mounted to the underside of the main panel of the transfer switch mechanism. This transfer switching mechanism includes a specially made cabinet which omits the opening for the power input receptacle. While this construction is highly satisfactory for directly wiring the power inlet box to the transfer switching mechanism, it requires modifications to conventional cord-connected transfer switch cabinets in omission of the input receptacle opening and mounting of the terminals within the cabinet.

It is an object of the present invention to provide a transfer switching mechanism having a cabinet equipped with a cover plate terminal assembly for preventing access to the interior of the cabinet and providing interconnection of a terminal arrangement within the cabinet. It is a further object of the present invention to provide a power transfer arrangement having a cover plate for covering a socket opening formed in a panel of the cabinet in combination with a terminal connector for receiving input power and providing electrical connection to the components of the transfer switching mechanism. It is also an object of the present invention to provide a power transfer device which ensures that a reliable connection is established with a generator when power is supplied to the transfer device. Another object of the present invention is to provide a transfer switching mechanism which is easy to install and which operates generally similarly to known transfer switching mechanisms. Still another object of the present invention is to provide a method of constructing a power transfer device which may be provided with either a socket-type power input receptacle or a terminal-type power input arrangement.

The invention contemplates an improvement in a power transfer arrangement for supplying power from a generator to the electrical system of the building. The power transfer arrangement has a power transfer device adapted for interconnection with the building electrical system and includes a cabinet having wall structure provided with an opening for accommodating a socket-type power input receptacle. The wall structure also supports various other electrical components of the power transfer device thereon. The invention resides in a terminal arrangement in the power transfer device and a cover engageable with the wall structure for covering the opening and preventing access to the terminal arrangement. The terminal arrangement is mounted to the cover, and enables power to be transferred from the generator to the remaining components of the power transfer device. The components of the power transfer device include a set of switches mounted to the wall structure for controlling the supply of power from the power transfer device to the building electrical system. The terminal arrangement includes a set of power input terminals for establishing an electrical connection between the power transfer device and a power inlet arrangement interconnected with the generator. The power input terminals are located within a terminal compartment defined by the cabinet at a location spaced from the set of switches. The electrical components on the wall structure also include a power output receptacle for selectively delivering generator power to a load plugged into the receptacle. The electrical components on the wall structure further include a pair of watt meters for displaying the amount of power provided by the generator, and a set of circuit breakers, with each circuit breaker being associated with one of the switches. A set of power input wires are adapted to be connected to the power input terminals for supplying power to the power transfer device from the generator through the power inlet arrangement. A conductor extends between the terminal arrangement and each of the watt meters, and a pair of conductors extend between the terminal arrangement and the power output receptacle.

The invention further contemplates an improvement in a power transfer device adapted for interconnection with the electrical system of a building and including a cabinet having a face plate provided with an opening for accommodating a power input receptacle adapted to receive a plug connector electrically connected to a generator. The face plate also supports various other electrical components of the power transfer device thereon. The invention is in the form of a terminal compartment defined by the cabinet, a set of terminals associated with the electrical components located within the cabinet, and a cover plate terminal assembly removably connected to the face plate and covering the opening to prevent access to the terminal compartment. The cover plate terminal assembly is also electrically connected to the electrical component terminals in the cabinet interior. The cover plate terminal assembly includes a cover plate, a terminal connector and spacing structure interposed between the cover plate and the terminal connector for spacing the terminal connector from the cover plate. In the preferred embodiment, the spacing structure is comprised of a Z-shaped bracket having a first end portion fixed to the face plate, a rearwardly extending portion joined to the first end portion and a second end portion fixed to the terminal connector by fasteners which are passed through the terminal connector and are threaded into the second end portion. In another embodiment of the invention, the spacing structure is comprised of at least one shimming-type element. The pair of fasteners extends through the terminal connector and the shimming-type element, and each fastener is screw threaded into the cover plate. The face plate is formed with a set of apertures located around the opening. The cover plate is formed with a set of through holes which are aligned with the face plate apertures, and a set of fasteners extends through the apertures and each fastener is screw threaded into the through holes to fix the cover plate terminal assembly relative to the face plate.

The invention also relates to a method for constructing a power transfer device having electrical components for supplying power from a generator in electrical communication with a separate power inlet to the electrical system of a building. The method includes the steps of providing a cabinet with an interior within which a set of connections corresponding to the electrical components is located; forming the cabinet with wall structure having an opening formed therein, and mounting a cover having a terminal connector over the opening and against the wall structure for preventing access to the terminal compartment and providing power from the generator to the electrical components of the power transfer device.

Another aspect of the invention relates to a power transfer device provided with electrical components for supplying power from the generator in electrical communication with a separate power inlet arrangement to the electrical system of a building. The power transfer device includes a cabinet defining an interior within which a set of terminals corresponding to the electrical components is located. The cabinet has a wall structure provided with an opening formed therein, and the wall structure supports the electrical components. A cover is mounted against the wall structure over the opening and has a terminal connector connected to the cover for preventing access to the cabinet interior and providing power to the set of electrical component terminals.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 5 is an exploded view showing a cover plate terminal assembly for mounting the front panel assembly of the power transfer arrangement;

FIG. 6 is a section view of the cover plate terminal assembly taken on line 6—6 of FIG. 5; and FIG. 7 is a view similar to FIG. 6 showing an alternative embodiment of a cover plate terminal assembly.

DETAILED DESCRIPTION OF THE INVENTION

Figure 1:
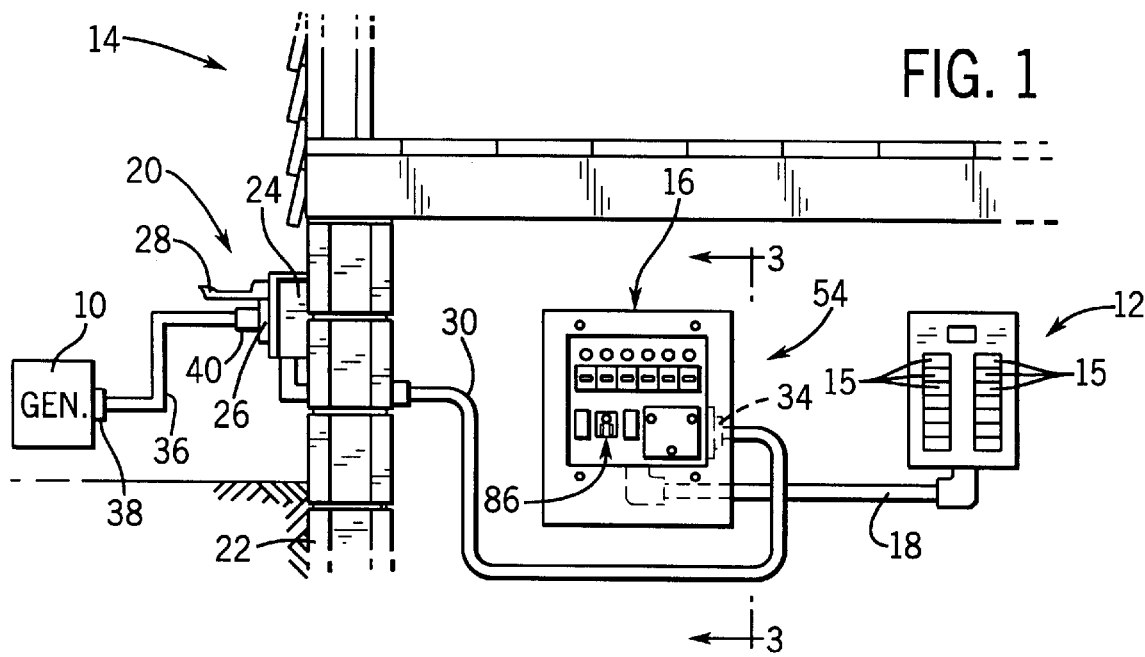
FIG. 1 is schematic representation showing the power transfer arrangement constructed according to the invention for interposition between a remote power inlet fed by a portable power generator and a main electrical panel associated with a building.

FIG. 1 shows a power supply arrangement for interconnecting a portable generator 10 with a main electrical panel or load center 12 located in the interior of a building 14. As is well known, the load center 12 is equipped with a plurality of circuit breaker switches 15, each of which is associated with a particular load circuit for normally running a load such as a furnace blower, sump pump or other device from a utility power source. In the power inlet arrangement of FIG. 1, a manual power transfer panel 16 constructed in accordance with the invention is mounted adjacent main panel 12, and is interconnected therewith via a series of wires enclosed in a conduit 18 extending between main panel 12 and transfer panel 16. The general construction of transfer panel 16 may be such as manufactured by Reliance Controls Corporation of Racine, Wis. under the designation GEN/TRAN (e.g. Model 20216 or any other satisfactory model).

A power inlet box 20 is mounted to a wall of the building 14, as shown at 22. Power inlet box 20 includes an external housing including a series of walls such as 24, and a recessed power inlet 26 mounted to a front wall of the housing. A cover 28 is mounted to the front wall of the housing via a hinge structure and is movable between an open position, as shown in FIG. 1, and a closed position in which cover 28 encloses recessed power inlet 26 when not in use. As set forth in the aforementioned '670 application, a conduit or nonmetallic-sheathed cable 30 extends between inlet box 20 and transfer panel 16, and provides a direct, non-plug type electrical connection therebetween. Appropriate wiring connections are contained within inlet box 20 and conduit or sheathed cable 30 for providing an electrical path between inlet box 20 and transfer panel 16. The conduit or sheathed cable 30 has a nipple end 34 connected to the transfer panel 16, as will be detailed below. Conduit or sheathed cable 30 completes the electrical connection between the generator 10 and the transfer panel 16 for supplying power to load center 12 through transfer panel 16 in the event of a power outage or the like.

A power cord 36 extends between generator 10 and power inlet box 20. Cord 36 includes a plug 38 at one end which is engageable with the power outlet of the generator 10. Cord 36 further includes a connector 40 at the end opposite plug 38. Connector 40 is engageable with recessed power inlet 26 for transferring power generated by generator 10 to power inlet box 20 which is then supplied through wiring contained within conduit or sheathed cable 30 to transfer panel 16 and from transfer panel 16 to load center 12. In this manner, generator 10 functions to provide power to selected circuits of load center 12 during a power outage. In this arrangement, the user simply connects cord 36 between generator 10 and power inlet 20, and then commences operation of generator 10.

Figure 3:
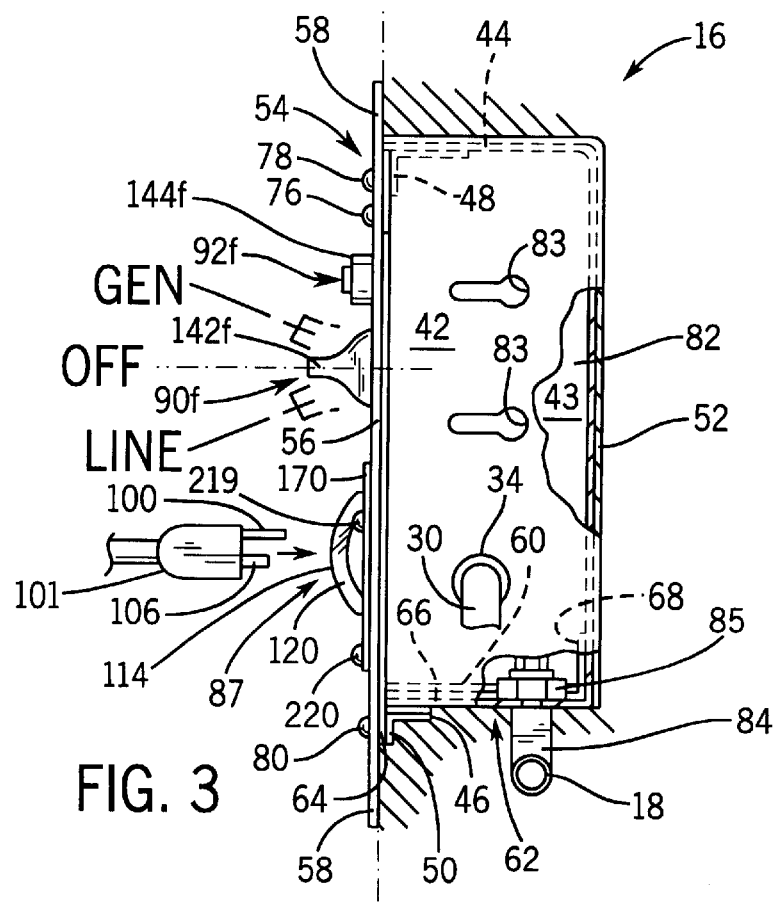
FIG. 3 is a partial section view of the power transfer arrangement taken on line 3—3 of FIG. 1.

Transfer panel 16 is interposed between load center 12 and inlet box 20. As seen in FIG. 3, transfer panel 16 includes a cabinet having wall structure defining a pair of parallel side walls 42,43, a top wall 44 extending between and interconnecting the upper ends of side walls 42,43, and a bottom wall 46 extending between and interconnecting the lower ends of side walls 42,43. Both the top wall 44 and the bottom wall 46 are provided with upper and lower flanges 48 and 50, respectively (FIG. 3), which depend downwardly from the forwardmost edges thereof. The cabinet also has a rear panel 52 and a removable front panel assembly 54 defined by a face plate 56 and a planar border plate 58 in surrounding relationship therewith. Face plate 56 is integrally formed with a rearwardly extending portion 60 which is reinforced by a Z-shaped bracket 62 connected, such as by welding, to the underside thereof. Bracket 62 has a downwardly directed front edge 64, a rearwardly extending intermediate plate 66 and an upwardly projecting rear edge 68. Front edge 64 is formed with a pair of spaced openings and is adapted to be slightly offset from the vertical plane of face plate 56 in overlying relationship to lower flange 50. Intermediate plate 66 underlies and cooperates with the rearwardly extending portion 60 to complete bottom wall 46. Rear edge 68 is adapted to lie in front of and complete rear panel 52.

To facilitate assembly of the transfer panel cabinet, face plate 56 has an upper edge 70 which is formed with apertures 72 (FIG. 4) and is connected to a rectangular extension plate 74 (FIG. 2) provided with a pair of upper openings and a pair of lower openings. Suitable fasteners 76 are passed through apertures 72 and are screw threaded into aligned lower openings of extension plate 74. Border plate 58 surrounds face plate 56 and overlies the upper portion of extension plate 74 and the front edge 64 of bracket 62. A first set of fasteners 78 passes through suitable holes provided in the upper part of border plate 58 and through the extension plate upper openings aligned therewith, and is screw threaded into suitably aligned openings in the upper flange 48. A second set of fasteners 80 passes through suitable holes formed in the lower part of border plate 58 and openings in front edge 64 aligned therewith, and is screw threaded into suitably aligned holes formed in the lower flange 50. In its assembled form, the cabinet has an interior space which defines a terminal compartment 82 (FIG. 3) for internal components of the transfer panel 16 to be further described. In the preferred embodiment, the side walls 42,43, top wall 44, partial bottom wall 46, and partial rear panel 52 are of a one-piece construction which is typically roughed into a wall recess and covered by the front panel assembly 54 which lies substantially flush against the surface of the building wall, as shown in FIG. 3. The cabinet may also be disposed such that the rear panel 52 is surface mounted against the wall structure. One or more keyholes 83 are formed in side walls 42,43 and are adapted to receive fasteners attached to the interior wall structure. Aligned holes formed in the rearwardly extending portion 60 and the rearwardly extending intermediate plate 66 allow entry of wires inside conduit 18 from load panel 12 to pass through a connector 84 attached to portion 60 by a lock nut 85, and enter from the bottom of the terminal compartment 82 for connection with transfer panel components to be described below. When it is necessary, access to the interior of transfer panel 16 is gained by removal of fasteners 78,80, so that, in turn, border plate 58 may be removed and face plate 56 may be moved forwardly from the remainder of the cabinet.

Figure 2:
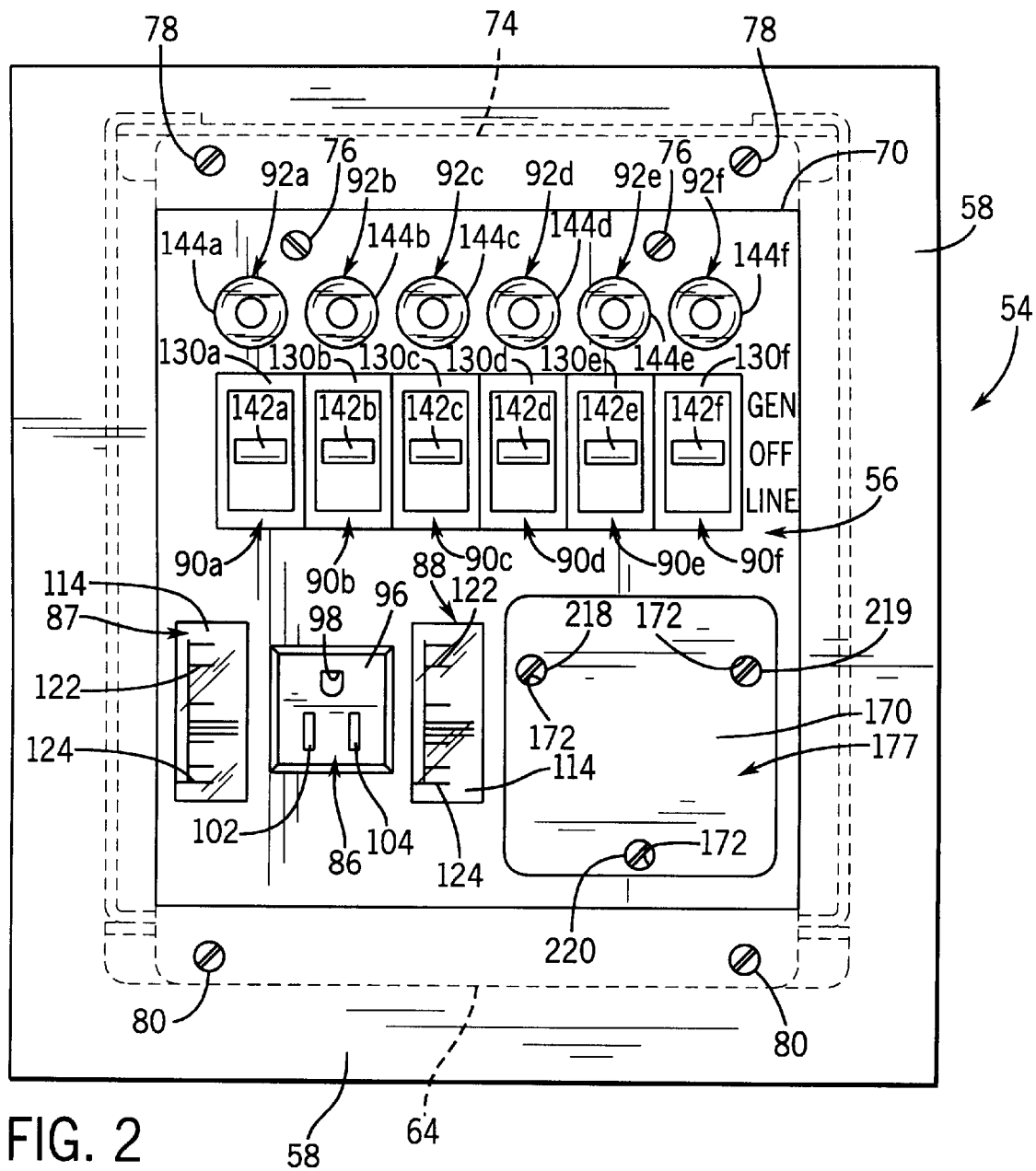
FIG. 2 is an enlarged, front elevational view of the power transfer arrangement shown in FIG. 1 illustrating a front panel assembly.
Figure 4:
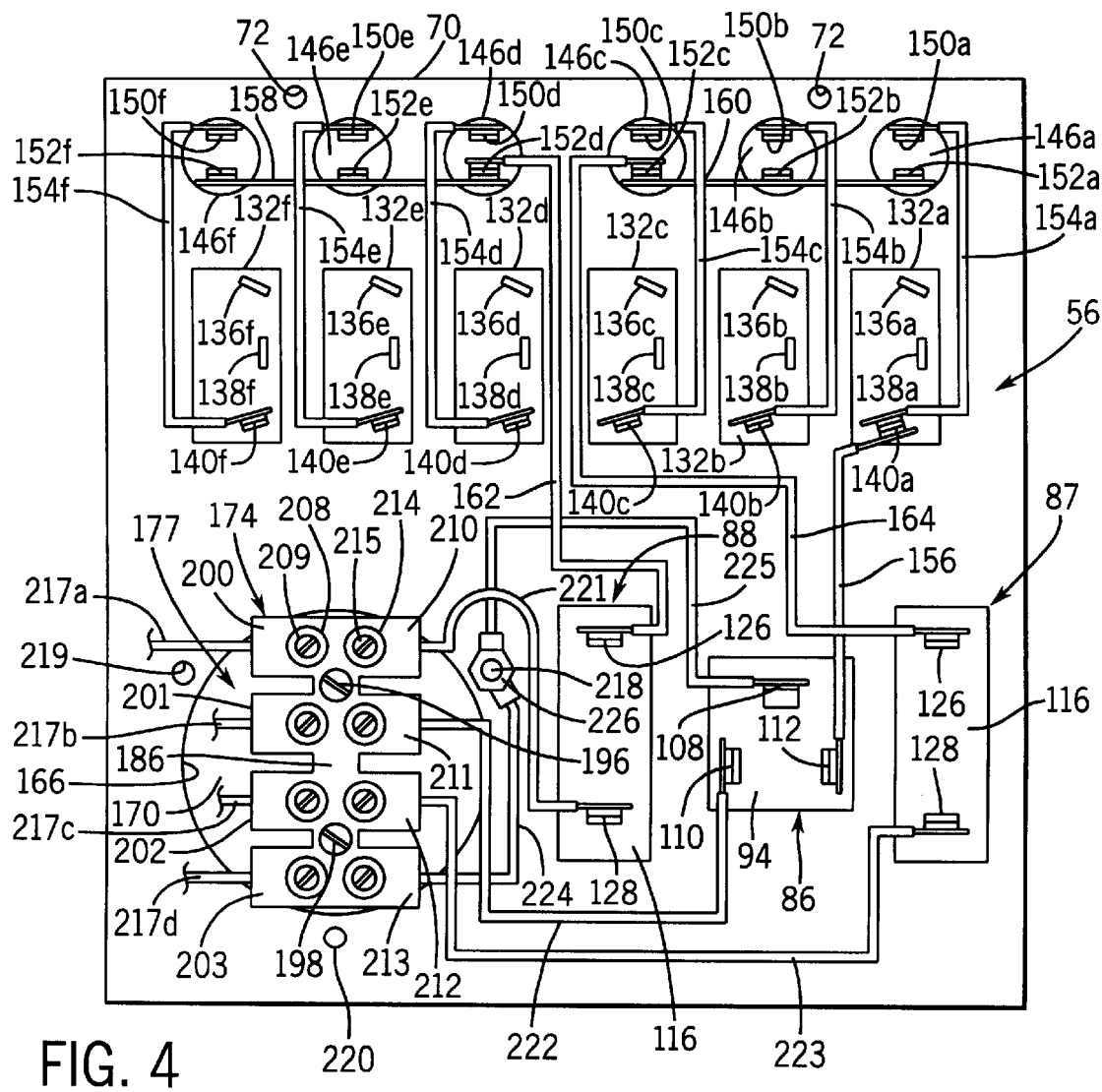
FIG. 4 is a partial, enlarged, rear elevational view of the front panel assembly of FIG. 2.

Referring to FIGS. 2 and 4, face plate 56 functions as a flat mounting surface for supporting various electrical components including a power output receptacle 86, a pair of watt meters 87,88 and a linear array of identical, adjacently disposed switches 90a–f. Also positioned on the face plate 56 and positioned above each of the switches 90a–f in association therewith is a respective, resettable circuit breaker 92a–f which corresponds to a particular load circuit. Power output receptacle 86 is selectively used in a plug-type connection to deliver generator power while watt meters 87, 88 are selectively employed to monitor generator power delivered to the electrical loads in the system. In addition, switches 90a–f are employed to effect the actual transfer of power from the generator to various loads. Circuit breakers 92a–f protect individual circuits from an abnormality by breaking the circuit such as in the event of a current overload.

Power output receptacle 86 (FIGS. 2 and 4) takes the form of a substantially square, female socket which projects through an opening in the face plate 56. The socket includes a rearwardly extending body 94 secured to the rear surface of face plate 56 by a suitable retainer structure, and a head plate 96 which overlies and engages the front surface of face plate 56. Head plate 96 is provided with an upper opening 98 which is adapted to receive a grounding prong 100 (FIG. 3) on a male plug 101 which is electrically connected to a load, such as an electrical appliance. In addition, a pair of lower openings 102,104 is provided and each is adapted to receive a respective terminal blade 106 (only one of which is seen in FIG. 3) of plug 101. Socket body 94 of power output receptacle 86 is provided with three terminals, namely an upper grounding terminal 108, a lower neutral terminal 110, and a lower power terminal 112 for connection with suitable wiring to be described.

Each of the watt meters 87,88 (FIGS. 2–4) has a convexly-shaped forward portion 114 integrally attached to a block-shaped rear portion 116. Each forward portion 114 projects through a respective rectangular opening formed in face plate 56, and is attached to the inside of the face plate 56 by suitable retainer structure. Each forward portion 114 defines a transparent window having a convexly-shaped support member 120 for mounting a wattage scale 122 visible through the window and an indicator 124 mounted for movement along the scale 122 in response to the supplying of generator power. Each rear portion 116 extends rearwardly and perpendicularly to face plate 56, and is provided with a pair of upper and lower terminals 126, 128, respectively, for connection with suitable wiring to be further explained below.

Each of the identical switches 90a–f (FIG. 2) has a respective, generally rectangular, cover plate 130a–f overlying the front surface of face plate 56, and a respective block-like switch body 132a–f which extends rearwardly through a suitable opening formed in the face plate 56. Each switch body 132a–f is held in place by a suitable retainer device acting against the rear surface of face plate 56. As seen in FIG. 4, the rear end of each switch body 132a–f is provided with an upper terminal 136a–f, a middle terminal 138a–f and a lower terminal 140a–f for connection with suitable wiring to be described. Each of the switches 90a–f is a commercially available double-throw construction having a respective identical lever 142a–f which is manually actuable to a LINE position when utility power is available, a GEN position when auxiliary or generator power replaces utility power, and an OFF position which signifies no electrical power is being transmitted to the load circuits. Switches 90a–f are designed such that each lever 142a–f must move to the OFF position before being placed in either the GEN or LINE positions.

Each of the transfer panel circuit breakers 92a–f (FIGS. 2–4) includes a respective cylindrical head 144a–f projecting forwardly from the face plate 56 above a respective one of the switches 90a–f, and a respective, reduced diameter, cylindrical body 146a–f extending rearwardly through an aperture formed in the face plate 56. A suitable retainer arrangement acts against a rear surface of the face plate 56 and maintains the position of each circuit breaker 92a–f relative thereto. The rearward end of each circuit breaker body 146a–f is provided with a respective upper terminal 150a–f and a respective lower terminal 152a–f for connection with suitable wiring to be described. Each respective circuit breaker upper terminal 150a–f is connected by a respective conductor 154a–f to a respective switch lower terminal 140a–f. For example, in FIG. 4, circuit breaker upper terminal 150f is connected by a conductor 154f to switch lower terminal 140f. A separate conductor 156 connects lower switch terminal 140f to output receptacle terminal 112. Circuit breaker lower terminals 152a–c are connected by a common conductor 158, while circuit breaker lower terminals 152d–f are connected by a common conductor 160. In addition, circuit breaker lower switch terminal 152c is connected by a conductor 162 to upper terminal 126 of watt meter 88. Circuit breaker lower switch terminal 152d is connected by a conductor 164 to upper terminal 126 of watt meter 87.

In addition to the aforedescribed structure, the cabinet wall structure and in particular, face plate 56 is formed in the area adjacent watt meter 88 and beneath switches 90d–f with a circular, socket opening 166 (FIGS. 4 and 5) which normally is used in combination with a generally cylindrical, socket body of a power input receptacle (not shown). Face plate 56 is further provided with a set of three equidistantly spaced apertures 168 located around the periphery of opening 166. Apertures 168 are alignable with recesses formed in a circular collar of the cylindrical power input receptacle and are adapted to receive a set of fasteners screw threaded therein. Such power input receptacle is of the type as disclosed in copending U.S. patent application Ser. No. 09/062,257 filed Apr. 17, 1998, and commonly assigned to the assignee of this application, the disclosure of which copending application is hereby incorporated by reference. The cylindrical power input receptacle provides an alternative device to conduit or sheathed cable 30 for delivering generator power to the transfer panel 16. In those situations where a power input receptacle is supplied, a flexible cord extends between inlet box 20 and transfer panel 16 and includes a plug-type connection which is received within the power inlet receptacle.

To convert transfer panel 16 from a plug-type power input construction to a directly wired power input arrangement as shown, circular socket opening 166 is covered by a generally square, flat cover plate 170 having three through-holes 172 adapted to align with the face plate apertures 168. In the preferred embodiment shown in FIGS. 4–6, a terminal arrangement in the form of a terminal connector 174 is secured to the rear surface of cover plate 170 by a Z-shaped bracket 176 which mounts to terminal connector 174 in a central, fixed position spaced from the cover plate rear surface. Together, cover plate 170, terminal connector 174 and bracket 176 define a cover plate terminal assembly 177 for preventing access to the terminal compartment 82 and enabling electrical interconnection of all terminals of the electrical components in the transfer panel 16. Bracket 176 includes a first end portion 178 which is secured, such as by spot welding 180, directly to the rear surface of cover plate 170, a rearwardly extending middle portion 182, and a second end portion 184 to which is joined to a back surface of the terminal connector 174. Terminal connector 174 is of a conventional construction and has a vertically extending core portion 186 with a pair of horizontally extending openings 188,190 which are adapted to align with suitable screw threaded apertures 192,194 formed in the bracket second end portion 184. To fix the terminal connector 174 in place, fasteners 196,198 are passed through the core openings 188,190 and screwed into the bracket apertures 192, 194. Terminal connector 174 (FIG. 5) also includes a first series of tubular cells 200,201,202,203, each of which carries a respective laterally extending, cylindrical metal receiver 204,205,206,207. Each cell 200–203 includes a rearwardly projecting cylindrical member 208 lying perpendicularly to a respective cell 200–203 and defining a passage for a threaded member, the head of which is shown at 209 (FIG. 4). Terminal connector 174 further includes a second series of tubular cells 210,211,212,213. Each tubular cell 210–213 carries a cylindrical metal receiver like receiver 204–207 and includes a rearwardly projecting cylindrical member 214 which receives a threaded member having a head 215 (FIG. 4).

Terminal connector 174 may illustratively be a terminal block construction such as is available from Altech Corporation of Somerville, N.J., under its Model No. TSF/16, although it is understood that any other satisfactory terminal connector could be employed. In a terminal connector such as this, tubular cells 200–203 and 210–213 are formed of a molded plastic material integrally with cylindrical members 208 and 214. These components surround metal receivers and metal contact elements 216 (FIG. 6) on both sides of the connector 174. Together, tubular cells 200–203 with their respective cylindrical members 208 and contact elements 216 define a set of power input terminals. In this manner, an electrical connection to the power input terminals of terminal connector 174 is made by inserting a bare wire into one of the cylindrical metal receivers 204–207 in tubular cells 200–203 and tightening threaded member head 209 to establish an electrical connection with the wire via the metal contact element 216 enclosed within cell 200–203. A similar operation is employed to connect a wire end to one of the metal receivers and contact elements 216 in cells 210–213.

Referring to FIGS. 1 and 3, conduit 30 encloses a set of input wires 217 a–d (FIGS. 4,5) which pass through a knock-out opening formed in the lower portion of side wall 42. Conduit or sheathed cable 30 is retained in place on transfer panel 16 by means of connector 34 and a lock nut (not shown). As can be appreciated, conduit or sheathed cable 30 could also be connected through a knock-out opening in opposite side wall 43 or in knock-out openings formed in bottom wall 46 of the lower portion of rear panel 52.

As shown in FIGS. 2 and 5, terminal connector 174 is passed in the direction of the arrow through the socket opening 166 such that the rear surface of cover plate 170 engages the front surface of face plate 56. To mount cover plate 170 in fixed position, a set of threaded fasteners 218,219,220 extends through cover plate through-holes 172 and is screwed into face plate apertures 168. In this manner, cover plate 170 is selectively engaged with face plate 56 to prevent access to the terminal compartment 82. With terminal connector 174 properly positioned as shown in FIG. 4, each respective input wire 217a–d is electrically connected with a respective power input terminal defined by a respective cell 200,201,202,203, a respective metal receiver 204, 205,206,207, a respective threaded member head 209, and a respective contact element 216. On the other side of terminal connector 174, a first wire 221 connects the metal receiver and tubular cell 210 with the lower terminal 128 on watt meter 88. A second wire 222 connects the metal receiver in tubular cell 211 with lower neutral terminal 110 on power output receptacle 86. A third wire 223 connects the metal receiver in tubular cell 212 with the lower terminal 128 on watt meter 87. A fourth wire 224 acts as a ground and connects the metal receiver in tubular cell 213 with the transfer panel face plate 56 via fastener 218. A separate conductor 225 also acting as ground has one end connected with the upper grounding terminal 108 of the power output receptacle 86. The other end of conductor 225 is provided with a nut 226 which is tightly screwed onto the threaded end of the fastener 218 to ground the ends of and retain wires 224 and 225 against the rear surface of the face plate 56.

Although not shown, output wires from the upper terminals 136a–f and lower terminals 138a–f of switches 90a–f extend through terminal compartment 82 to elbow 84 secured to bottom wall portion 60 by lock nut 85 for routing the wires through conduit 18 to load center 12. Other wires extend through the terminal compartment 82, such as neutral and ground wires from load center 12.

The ends of wires 221–224 are connected to terminal connector 174 by placing the bare end of each respective wire 221–224 into a respective one of the tubular cells 210–213 and receivers 204–207, and tightening the associated threaded members 215 as explained previously to establish an electrical connection with a contact element 216. In this manner, the terminal connector 174 enables electrical interconnection of all terminals of power output receptacle 86, watt meters 87,88, switches 90a–f and circuit breakers 92a–f in transfer panel 16. This arrangement aids a person such as an electrician or do-it-yourself homeowner in installing transfer panel 16 without a socket-type, cylindrical power input receptacle even though the face plate 56 is provided with an opening 166 therefor. With the transfer panel 16 connected to the load center 12, after generator cord 36 is plugged into the power inlet box, the only necessary operation in connection with transfer panel 16 to enable transfer of power from generator 10 to load center 12 is to place switches 90a–f in the appropriate position so as to transfer power to load center 12 as desired in response to operation of the generator 10.

FIG. 7 discloses an alternative embodiment of the cover plate terminal assembly 177' having substantially identical components as previously described above, except for the mounting of terminal connector 174' to cover plate 170'. Instead of using Z-shaped bracket 176, fastener 196' is passed through core opening 188 and a shimming-type spacer 227, and is screw-threaded into an aperture 228 formed in cover plate 170'. Likewise, fastener 198' is passed through core opening 190 and a shimming-type spacer 230, and is screw threaded into an aperture 232 formed in cover plate 170'. It should be understood that depending on the desired position of terminal connector 174' from cover plate 170', more than one spacer 227,230 may be utilized.

It can thus be appreciated that the cover plate terminal assembly 177,177' provides a convenient way to prevent access to the terminal compartment 82 and also provides a terminal arrangement in the form of a terminal connector 174,174' which enables electrical interconnection with the electrical components inside the transfer switch cabinet. Access to the terminal compartment 82 is obtained by removal of fasteners 78,80 so that, in turn, border plate 58 can be removed and face plate 56 may be moved forwardly from the remainder of the transfer panel cabinet. Once the user has completed the necessary operations in terminal compartment 82, he or she simply replaces face plate 56 and border plate 58 with screws 78,80 to prevent access to terminal compartment 82. Screws 218–220 are usually removed and subsequently replaced when it is desired to mount a socket-type cylindrical power inlet receptacle in the face plate socket opening 166. Accordingly, it should be further appreciated that a manufacturer can provide a transfer panel face plate 56 with either the cover plate terminal assembly 177,177' of the present invention or a socket-type, cylindrical power input receptacle as described in the aforementioned copending '257 application. The interchangeability of the cover plate 170,170' and the collar of the socket-type, cylindrical power input receptacle provides significant efficiencies in manufacturing by providing a number of common components for different models of transfer switches. It should be understood that a transfer panel 16 having a socket opening 166 can be easily retrofit in the field with either a socket-type power input receptacle or a cover plate terminal assembly, depending upon the desired power input configuration.

While the preferred embodiment shows socket opening 166 formed in the face plate 56, it should be understood that the invention also embraces a socket opening formed in any surface of the wall structure and covered by the cover plate terminal assembly, as described above.

Various alternatives and embodiments are contemplated as being within the scope of the following claims particularly pointing out and distinctly claiming the subject matter regarded as the invention.

I claim:

1. In a power transfer arrangement for supplying power from a generator to the electrical system of a building, the power transfer arrangement having a power transfer device adapted for interconnection with the building electrical system and including a cabinet having a wall structure and a face plate provided with a socket opening for accommodating a socket-type power input receptacle, the improvement comprising:
   a terminal arrangement in the power transfer device; and
   a cover engageable with the face plate for covering the socket opening and preventing access to the terminal arrangement, the socket cover being connected with the terminal arrangement for enabling power to be transferred from the generator to the various other electrical components of the power transfer device.

2. The improvement of claim 1, wherein the electrical components of the power transfer device include a set of switches mounted to the wall structure for controlling the supply of power from the power transfer device to the building electrical system.

3. The improvement of claim 2, wherein the terminal arrangement further includes a set of power input terminals for establishing a non-plug-type electrical connection between the power transfer device and a power inlet arrangement interconnected with the generator, wherein the power input terminals are located within an internal compartment defined by the cabinet at a location spaced from the set of switches.

4. The improvement of claim 3, wherein the electrical components include a set of circuit breakers, there being one circuit breaker associated with each of the switches.

5. The improvement of claim 4, wherein the electrical components further include a pair of watt meters for displaying the amount of power provided by the generator.

6. The improvement of claim 5, wherein the electrical components include an output receptacle for selectively delivering generator power to an electrical load plugged therein.

7. The improvement of claim 6, wherein the terminal arrangement is constructed and arranged to interconnect the switches, the watt meters, the circuit breakers and the power output receptacle.

8. The improvement of claim 5, wherein the terminal arrangement further includes a set of power input conductors connected to the power input terminals.

9. The improvement of claim 8, wherein a first conductor extends between the terminal arrangement and the one of the watt meters, a second conductor extends between the terminal arrangement and the output receptacle, a third conductor extends between the terminal arrangement and the other watt meter, and a fourth conductor extends between the terminal arrangement and the wall structure.

10. In a power transfer device adapted for interconnection with the electrical system of a building, and including a cabinet having a face plate provided with an opening for accommodating a power input receptacle adapted to receive a plug connector electrically connected to a generator, the improvement comprising:

an internal compartment defined by the cabinet, a set of connections associated with the electrical components located within the internal compartment and a cover plate terminal assembly removably connected to the face plate and covering the opening to prevent access to the internal compartment, the cover plate terminal assembly also being electrically interconnected with the connections in the internal compartment such that electrical power is adapted to be selectively transferred from the generator to the electrical components.

11. The improvement of claim 10, wherein the cover plate terminal assembly includes a cover plate, a terminal connector and spacing structure interposed between the cover plate and the terminal connector for spacing the terminal connector from the cover plate.

12. The improvement of claim 11, wherein the spacing structure comprises a Z-shaped bracket having a first end portion fixed to the face plate, a rearwardly extending portion joined to the first end portion and a second end portion fixed to the terminal connector by a pair of fasteners passed through the terminal connector and threaded into the second end portion.

13. The improvement of claim 11, wherein the face plate is formed with a set of apertures located around the socket opening, the cover plate is formed with a set of through holes which are aligned with the face plate apertures, and fasteners extend through the apertures and are screw threaded into the through holes to fix the cover plate terminal assembly relative to the face plate.

14. A method for constructing a power transfer device having various electrical components for supplying power from a generator in electrical communication with a separate power inlet arrangement to the electrical system of a building, the method comprising the steps of:

providing a cabinet defining an internal compartment within which a set of connections for the electrical components are located;

forming the cabinet with wall structure and a face plate having an opening formed therein; and mounting a cover having a terminal connector over the opening and against the face plate wall structure for preventing access to the internal compartment and for receiving power input wiring, wherein the terminal connector is interconnected with the set of electrical component connectors such that electrical power is selectively transferred from the generator to the electrical components of the power transfer device through the terminal connector.

15. A power transfer device having electrical components for supplying power from a generator in electrical communication with a separate power inlet arrangement to the electrical system of a building, the power transfer device comprising:

a cabinet defining an internal compartment within which a set of connections corresponding to the electrical components is located, the cabinet having wall structure and a face plate provided with an opening formed therein; and a cover mounted against the face plate over the opening and having a terminal connector connected to the cover for preventing access to the terminal compartment and electrically interconnected with the set of connections such that electrical power is selectively transferred from the generator to the building electrical system.

* * * * *